(12) United States Patent
Jones et al.

(10) Patent No.: US 11,671,825 B2
(45) Date of Patent: Jun. 6, 2023

(54) METHOD AND SYSTEM FOR AUTHENTICATING A DEVICE

(71) Applicant: SONOS EXPERIENCE LIMITED, Hayes (GB)

(72) Inventors: Daniel John Jones, London (GB); James Andrew Nesfield, Edinburgh (GB)

(73) Assignee: Sonos Experience Limited, Hayes (GB)

( * ) Notice: Subject to any disclaimer, the term of this patent is extended or adjusted under 35 U.S.C. 154(b) by 361 days.

(21) Appl. No.: 16/496,685

(22) PCT Filed: Mar. 23, 2018

(86) PCT No.: PCT/GB2018/050779
§ 371 (c)(1),
(2) Date: Sep. 23, 2019

(87) PCT Pub. No.: WO2018/172797
PCT Pub. Date: Sep. 27, 2018

(65) Prior Publication Data
US 2020/0037159 A1    Jan. 30, 2020

(30) Foreign Application Priority Data

Mar. 23, 2017 (GB) .................................. 1704636

(51) Int. Cl.
*H04L 29/06* (2006.01)
*H04W 12/06* (2021.01)
(Continued)

(52) U.S. Cl.
CPC ............ *H04W 12/06* (2013.01); *H04B 11/00* (2013.01); *H04L 63/08* (2013.01); *H04W 12/50* (2021.01); *H04W 12/65* (2021.01); *H04W 84/12* (2013.01)

(58) Field of Classification Search
CPC ..... H04W 12/06; H04W 12/50; H04W 12/65; H04W 84/12; H04L 63/08
See application file for complete search history.

(56) References Cited

U.S. PATENT DOCUMENTS

| 4,045,616 A | 8/1977 | Sloane |
| 4,048,074 A | 9/1977 | Bruenemann et al. |

(Continued)

FOREIGN PATENT DOCUMENTS

| CN | 105790852 A | 7/2016 |
| CN | 106921650 A | 7/2017 |

(Continued)

OTHER PUBLICATIONS

International Search Report for PCT/GB2018/050779, dated Jun. 19, 2018, 3 pages.

(Continued)

*Primary Examiner* — Jeffrey C Pwu
*Assistant Examiner* — Thong P Truong
(74) *Attorney, Agent, or Firm* — Nixon & Vanderhye, P.C.

(57) ABSTRACT

The present invention relates to a method for authenticating a device with a wireless access point. The method includes receiving an audio signal at the device via a microphone; processing the audio signal to extract a code; using the code to authenticate the device, at least in part, with the wireless access point; and in response to the authentication, providing access to one or more network Services to the device via the wireless access point. A system and software are also disclosed.

22 Claims, 8 Drawing Sheets

(51) Int. Cl.
*H04B 11/00* (2006.01)
*H04L 9/40* (2022.01)
*H04W 84/12* (2009.01)
*H04W 12/50* (2021.01)
*H04W 12/65* (2021.01)

(56) References Cited

U.S. PATENT DOCUMENTS

| | | |
|---|---|---|
| 4,101,885 A | 7/1978 | Blum |
| 6,133,849 A | 10/2000 | McConnell et al. |
| 6,163,803 A | 12/2000 | Watanabe |
| 6,532,477 B1 | 3/2003 | Tang et al. |
| 6,711,538 B1 | 3/2004 | Omori et al. |
| 6,766,300 B1 | 7/2004 | Laroche |
| 6,909,999 B2 | 6/2005 | Thomas et al. |
| 6,996,532 B2 | 2/2006 | Thomas |
| 7,058,726 B1 | 6/2006 | Osaku et al. |
| 7,349,668 B2 | 3/2008 | Ilan et al. |
| 7,379,901 B1 | 5/2008 | Philyaw |
| 7,403,743 B2 | 7/2008 | Welch |
| 7,944,847 B2 | 5/2011 | Trine et al. |
| 8,494,176 B2 | 7/2013 | Suzuki et al. |
| 8,594,340 B2 | 11/2013 | Takara et al. |
| 9,118,401 B1 | 8/2015 | Nieto et al. |
| 9,137,243 B2 | 9/2015 | Suzuki et al. |
| 9,270,811 B1 | 2/2016 | Atlas |
| 9,344,802 B2 | 5/2016 | Suzuki et al. |
| 10,090,003 B2 | 10/2018 | Wang |
| 10,186,251 B1 | 1/2019 | Mohammadi |
| 2002/0107596 A1 | 8/2002 | Thomas et al. |
| 2002/0152388 A1 | 10/2002 | Linnartz et al. |
| 2002/0184010 A1 | 12/2002 | Eriksson et al. |
| 2003/0065918 A1 | 4/2003 | Willey |
| 2003/0195745 A1 | 10/2003 | Zinser, Jr. et al. |
| 2003/0212549 A1 | 11/2003 | Steentra et al. |
| 2004/0002858 A1 | 1/2004 | Attias et al. |
| 2004/0081078 A1 | 4/2004 | McKnight et al. |
| 2004/0133789 A1 | 7/2004 | Gantman et al. |
| 2004/0148166 A1 | 7/2004 | Zheng |
| 2004/0264713 A1 | 12/2004 | Grzesek |
| 2005/0049732 A1 | 3/2005 | Kanevsky et al. |
| 2005/0086602 A1 | 4/2005 | Philyaw et al. |
| 2005/0219068 A1 | 10/2005 | Jones et al. |
| 2006/0167841 A1 | 7/2006 | Allan et al. |
| 2006/0253209 A1 | 11/2006 | Hersbach et al. |
| 2006/0287004 A1 | 12/2006 | Fuqua |
| 2007/0063027 A1 | 3/2007 | Belfer et al. |
| 2007/0121918 A1 | 5/2007 | Tisch |
| 2007/0144235 A1 | 6/2007 | Werner et al. |
| 2007/0174052 A1 | 7/2007 | Manjunath et al. |
| 2007/0192672 A1 | 8/2007 | Bodin et al. |
| 2007/0192675 A1 | 8/2007 | Bodin et al. |
| 2007/0232257 A1 | 10/2007 | Otani et al. |
| 2008/0002882 A1 | 1/2008 | Voloshynovskyy et al. |
| 2008/0011825 A1 | 1/2008 | Giordano et al. |
| 2008/0027722 A1 | 1/2008 | Haulick et al. |
| 2008/0031315 A1 | 2/2008 | Ramirez et al. |
| 2008/0059157 A1 | 3/2008 | Fukuda et al. |
| 2008/0112885 A1 | 5/2008 | Okunev et al. |
| 2008/0144624 A1* | 6/2008 | Marcondes ......... H04L 43/0864 370/503 |
| 2008/0232603 A1 | 9/2008 | Soulodre |
| 2008/0242357 A1 | 10/2008 | White |
| 2008/0262928 A1 | 10/2008 | Michaelis |
| 2009/0119110 A1 | 5/2009 | Oh et al. |
| 2009/0141890 A1 | 6/2009 | Steenstra et al. |
| 2009/0254485 A1 | 10/2009 | Baentsch et al. |
| 2010/0030838 A1 | 2/2010 | Atsmon et al. |
| 2010/0064132 A1 | 3/2010 | Ravikiran Sureshbabu |
| 2010/0088390 A1 | 4/2010 | Bai et al. |
| 2010/0134278 A1 | 6/2010 | Srinivasan et al. |
| 2010/0146115 A1 | 6/2010 | Bezos |
| 2010/0223138 A1 | 9/2010 | Dragt |
| 2010/0267340 A1 | 10/2010 | Lee |
| 2010/0290641 A1 | 11/2010 | Steele |
| 2011/0173208 A1 | 7/2011 | Vogel |
| 2011/0276333 A1 | 11/2011 | Wang et al. |
| 2011/0277023 A1 | 11/2011 | Meylemans et al. |
| 2012/0045994 A1* | 2/2012 | Koh ............... H04W 12/02 455/41.3 |
| 2012/0084131 A1 | 4/2012 | Bergel et al. |
| 2012/0214416 A1 | 8/2012 | Kent et al. |
| 2013/0010979 A1 | 1/2013 | Takara et al. |
| 2013/0030800 A1 | 1/2013 | Tracey et al. |
| 2013/0034243 A1 | 2/2013 | Yermeche et al. |
| 2013/0077798 A1 | 3/2013 | Otani et al. |
| 2013/0216058 A1 | 8/2013 | Furuta et al. |
| 2013/0223279 A1 | 8/2013 | Tinnakornsrisuphap et al. |
| 2013/0275126 A1 | 10/2013 | Lee |
| 2014/0028818 A1* | 1/2014 | Brockway, III ....... H04W 8/005 348/61 |
| 2014/0046464 A1 | 2/2014 | Reimann |
| 2014/0053281 A1 | 2/2014 | Benoit et al. |
| 2014/0074469 A1 | 3/2014 | Zhidkov |
| 2014/0142958 A1 | 5/2014 | Sharma et al. |
| 2014/0164629 A1 | 6/2014 | Barth et al. |
| 2014/0172141 A1 | 6/2014 | Mangold |
| 2014/0172429 A1 | 6/2014 | Butcher et al. |
| 2014/0258110 A1* | 9/2014 | Davis ................. G06Q 30/0611 705/41 |
| 2015/0004935 A1 | 1/2015 | Fu |
| 2015/0088495 A1 | 3/2015 | Jeong et al. |
| 2015/0141005 A1 | 5/2015 | Suryavanshi et al. |
| 2015/0215299 A1 | 7/2015 | Burch et al. |
| 2015/0271676 A1* | 9/2015 | Shin ................... H04W 12/06 713/168 |
| 2015/0349841 A1 | 12/2015 | Mani et al. |
| 2015/0382198 A1* | 12/2015 | Kashef ................ H04W 4/50 726/5 |
| 2016/0098989 A1 | 4/2016 | Layton et al. |
| 2017/0279542 A1 | 9/2017 | Knauer et al. |
| 2018/0106897 A1 | 4/2018 | Shouldice et al. |
| 2020/0105128 A1 | 4/2020 | Frank |
| 2020/0169327 A1 | 5/2020 | Lin et al. |
| 2021/0098008 A1 | 4/2021 | Nesfield et al. |

FOREIGN PATENT DOCUMENTS

| | | |
|---|---|---|
| EP | 1760693 A1 | 3/2007 |
| EP | 2334111 A1 | 6/2011 |
| EP | 2916554 A1 | 9/2015 |
| EP | 3275117 A1 | 1/2018 |
| EP | 3526912 A1 | 8/2019 |
| GB | 2369995 A | 6/2002 |
| GB | 2484140 A | 4/2012 |
| JP | H1078928 A | 3/1998 |
| JP | 2001320337 A | 11/2001 |
| JP | 2004512765 A | 4/2004 |
| JP | 2004139525 A | 5/2004 |
| JP | 2007121626 A | 5/2007 |
| JP | 2007195105 A | 8/2007 |
| JP | 2008219909 A | 9/2008 |
| WO | 0115021 A2 | 3/2001 |
| WO | 0150665 A1 | 7/2001 |
| WO | 0161987 A2 | 8/2001 |
| WO | 0163397 A1 | 8/2001 |
| WO | 0211123 A2 | 2/2002 |
| WO | 0235747 A2 | 5/2002 |
| WO | 2004002103 A1 | 12/2003 |
| WO | 2005006566 A2 | 1/2005 |
| WO | 2008131181 A2 | 10/2008 |
| WO | 2016094687 A1 | 6/2016 |

OTHER PUBLICATIONS

Written Opinion of the ISA for PCT/GB2018/050779, dated Jun. 19, 2018, 5 pages.
Bourguet et al. "A Robust Audio Feature Extraction Algorithm for Music Identification," AES Convention 129; Nov. 4, 2010, 7 pages.
C. Beaugeant and H. Taddei, "Quality and computation load reduction achieved by applying smart transcoding between CELP speech

(56) References Cited

OTHER PUBLICATIONS codecs," 2007, 2007 15th European Signal Processing Conference, pp. 1372-1376.
European Patent Office, Decision to Refuse dated Nov. 13, 2019, issued in connection with European Patent Application No. 11773522.5, 52 pages.
European Patent Office, European EPC Article 94.3 dated Oct. 8, 2021, issued in connection with European Application No. 17790809.2, 9 pages.
European Patent Office, European EPC Article 94.3 dated Dec. 10, 2021, issued in connection with European Application No. 18845403.7, 41 pages.
European Patent Office, European EPC Article 94.3 dated Oct. 12, 2021, issued in connection with European Application No. 17795004.5, 8 pages.
European Patent Office, European EPC Article 94.3 dated Oct. 28, 2021, issued in connection with European Application No. 18752180.2, 7 pages.
European Patent Office, European Extended Search Report dated Aug. 31, 2020, issued in connection with European Application No. 20153173.8, 8 pages.
European Patent Office, Summons to Attend Oral Proceedings dated Mar. 15, 2019, issued in connection with European Application No. 11773522.5-1217, 10 pages.
Final Office Action dated Oct. 16, 2014, issued in connection with U.S. Appl. No. 12/926,470, filed Nov. 19, 2010, 22 pages.
Final Office Action dated Aug. 17, 2017, issued in connection with U.S. Appl. No. 12/926,470, filed Nov. 19, 2010, 22 pages.
Final Office Action dated Nov. 30, 2015, issued in connection with U.S. Appl. No. 12/926,470, filed Nov. 19, 2010, 25 pages.
Final Office Action dated Apr. 20, 2020, issued in connection with U.S. Appl. No. 16/012,167, filed Jun. 19, 2018, 21 pages.
Gerasimov et al. "Things That Talk: Using sound for device-to-device and device-to-human communication", Feb. 2000 IBM Systems Journal 39(3.4):530-546, 18 pages. [Retrieved Online] URL https://www.researchgate.net/publication/224101904_Things_that_talk_Using_sound_for_device-to-device_and_device-to-human_communication.
Glover et al. "Real-time detection of musical onsets with linear prediction and sinusoidal modeling.", 2011 EURASIP Journal on Advances in Signal Processing 2011, 68, Retrieved from the Internet URL: https://doi.org/10.1186/1687-6180-2011-68, Sep. 20, 2011, 13 pages.
Gomez et al: "Distant talking robust speech recognition using late reflection components of room impulse response", Acoustics, Speech and Signal Processing, 2008. ICASSP 2008. IEEE International Conference on, IEEE, Piscataway, NJ, USA, Mar. 31, 2008, XP031251618, ISBN: 978-1-4244-1483-3, pp. 4581-4584.
Gomez et al., "Robust Speech Recognition in Reverberant Environment by Optimizing Multi-band Spectral Subtraction", 2013 IEEE International Conference on Acoustics, Speech and Signal Processing ICASSP, Jan. 1, 2008, 6 pages.
Goodrich et al., Using Audio inn Secure Device Pairing, International Journal of Security and Networks, vol. 4, No. 1.2, Jan. 1, 2009, p. 57, Inderscience Enterprises Ltd., 12 pages.
International Bureau, International Preliminary Report on Patentability and Written Opinion, dated Apr. 16, 2019, issued in connection with International Application No. PCT/GB2017/053112, filed on Oct. 13, 2017, 12 pages.
International Bureau, International Preliminary Report on Patentability and Written Opinion, dated Apr. 16, 2019, issued in connection with International Application No. PCT/GB2017/053113, filed on Oct. 13, 2017, 8 pages.
International Bureau, International Preliminary Report on Patentability and Written Opinion, dated Dec. 17, 2019, issued in connection with International Application No. PCT/GB2018/051645, filed on Jun. 14, 2018, 7 pages.
International Bureau, International Preliminary Report on Patentability and Written Opinion, dated Mar. 19, 2019, issued in connection with International Application No. PCT/GB2017/052787, filed on Sep. 19, 2017, 7 pages.
International Bureau, International Preliminary Report on Patentability and Written Opinion, dated Jun. 23, 2020, issued in connection with International Application No. PCT/GB2018/053733, filed on Dec. 20, 2018, 7 pages.
International Bureau, International Preliminary Report on Patentability and Written Opinion, dated Sep. 24, 2019, issued in connection with International Application No. PCT/GB2018/050779, filed on Mar. 23, 2018, 6 pages.
International Bureau, International Search Report and Written Opinion dated Apr. 11, 2019, issued in connection with International Application No. PCT/GB2018/053733, filed on Dec. 20, 2018, 10 pages.
International Bureau, International Search Report and Written Opinion dated Oct. 4, 2018, issued in connection with International Application No. PCT/GB2018/051645, filed on Jun. 14, 2018, 14 pages.
International Searching Authority, International Search Report and Written Opinion dated Mar. 13, 2018, issued in connection with International Application No. PCT/GB2017/053112, filed on Oct. 13, 2017, 18 pages.
International Searching Authority, International Search Report and Written Opinion dated Nov. 29, 2017, in connection with International Application No. PCT/GB2017/052787, 10 pages.
International Searching Authority, International Search Report and Written Opinion dated Nov. 30, 2011, in connection with International Application No. PCT/GB2011/051862, 6 pages.
International Searching Authority, International Search Report dated Jan. 18, 2018, issued in connection with International Application No. PCT/GB2017/053113, filed on Oct. 17, 2017, 11 pages.
Japanese Patent Office, Office Action dated Jun. 23, 2015, issued in connection with JP Application No. 2013-530801, 8 pages.
Japanese Patent Office, Office Action dated Apr. 4, 2017, issued in connection with JP Application No. 2013-530801, 8 pages.
Japanese Patent Office, Office Action dated Jul. 5, 2016, issued in connection with JP Application No. 2013-530801, 8 pages.
Lopes et al. "Acoustic Modems for Ubiquitous Computing", IEEE Pervasive Computing, Mobile and Ubiquitous Systems. vol. 2, No. 3 Jul.-Sep. 2003, pp. 62-71. [Retrieved Online] URL https://www.researchgate.net/publication/3436996_Acoustic_modems_for_ubiquitous_computing.
Madhavapeddy, Anil. Audio Networking for Ubiquitous Computing, Oct. 24, 2003, 11 pages.
Madhavapeddy et al., Audio Networking: The Forgotten Wireless Technology, IEEE CS and IEEE ComSoc, Pervasive Computing, Jul.-Sep. 2005, pp. 55-60.
Madhavapeddy et al., Context-Aware Computing with Sound, University of Cambridge 2003, pp. 315-332.
Monaghan et al. "A method to enhance the use of interaural time differences for cochlear implants in reverberant environments.", published Aug. 17, 2016, Journal of the Acoustical Society of America, 140, pp. 1116-1129. Retrieved from the Internet URL: https://asa.scitation.org/doi/10.1121/1.4960572 Year: 2016, 15 pages.
Non-Final Office Action dated Mar. 25, 2015, issued in connection with U.S. Appl. No. 12/926,470, filed Nov. 19, 2010, 24 pages.
Non-Final Office Action dated Mar. 28, 2016, issued in connection with U.S. Appl. No. 12/926,470, filed Nov. 19, 2010, 26 pages.
Non-Final Office Action dated Jan. 6, 2017, issued in connection with U.S. Appl. No. 12/926,470, filed Nov. 19, 2010, 22 pages.
Non-Final Office Action dated Aug. 9, 2019, issued in connection with U.S. Appl. No. 16/012,167, filed Jun. 19, 2018, 15 pages.
Non-Final Office Action dated Feb. 5, 2014, issued in connection with U.S. Appl. No. 12/926,470, filed Nov. 19, 2010, 22 pages.
Non-Final Office Action dated Aug. 12, 2021, issued in connection with U.S. Appl. No. 16/342,060, filed Apr. 15, 2019, 88 pages.
Non-Final Office Action dated Sep. 24, 2020, issued in connection with U.S. Appl. No. 16/012,167, filed Jun. 19, 2018, 20 pages.
Non-Final Office Action dated Dec. 27, 2021, issued in connection with U.S. Appl. No. 16/956,905, filed Jun. 22, 2020, 12 pages.

(56) References Cited

OTHER PUBLICATIONS

Non-Final Office Action dated Jan. 29, 2021, issued in connection with U.S. Appl. No. 16/342,060, filed Apr. 15, 2019, 59 pages.
Non-Final Office Action dated Feb. 5, 2021, issued in connection with U.S. Appl. No. 16/342,078, filed Apr. 15, 2019, 13 pages.
Non-Final Office Action dated Sep. 7, 2021, issued in connection with U.S. Appl. No. 16/623,160, filed Dec. 16, 2019, 11 pages.
Notice of Allowance dated Mar. 15, 2018, issued in connection with U.S. Appl. No. 12/926,470, filed Nov. 19, 2010, 10 pages.
Notice of Allowance dated Mar. 19, 2021, issued in connection with U.S. Appl. No. 16/012,167, filed Jun. 19, 2018, 9 pages.
Notice of Allowance dated Feb. 18, 2022, issued in connection with U.S. Appl. No. 16/564,766, filed Sep. 9, 2019, 8 pages.
Soriente et al., "HAPADEP: Human-Assisted Pure Audio Device Pairing*" Computer Science Department, University of California Irvine, 12 pages. [Retrieved Online] URLhttps://www.researchgate.net/publication/220905534_HAPADEP_Human-assisted_pure_audio_device_pairing.
Tarr, E.W. "Processing perceptually important temporal and spectral characteristics of speech", 2013, Available from ProQuest Dissertations and Theses Professional. Retrieved from https://dialog.proquest.com/professional/docview/1647737151?accountid=131444, 200 pages.
United Kingdom Patent Office, United Kingdom Examination Report dated Oct. 8, 2021, issued in connection with United Kingdom Application No. GB2113511.6, 7 pages.
United Kingdom Patent Office, United Kingdom Examination Report dated Jun. 11, 2021, issued in connection with United Kingdom Application No. GB1716909.5, 5 pages.
United Kingdom Patent Office, United Kingdom Examination Report dated Feb. 2, 2021, issued in connection with United Kingdom Application No. GB1715134.1, 5 pages.
United Kingdom Patent Office, United Kingdom Examination Report dated Oct. 29, 2021, issued in connection with United Kingdom Application No. GB1709583.7, 3 pages.
United Kingdom Patent Office, United Kingdom Office Action dated Jan. 22, 2021, issued in connection with United Kingdom Application No. GB1906696.8, 2 pages.
United Kingdom Patent Office, United Kingdom Office Action dated Jan. 28, 2022, issued in connection with United Kingdom Application No. GB2113511.6, 3 pages.
United Kingdom Patent Office, United Kingdom Office Action dated Feb. 9, 2022, issued in connection with United Kingdom Application No. GB2117607.8, 3 pages.
United Kingdom Patent Office, United Kingdom Search Report dated Sep. 22, 2021, issued in connection with United Kingdom Application No. GB2109212.7, 5 pages.
Wang, Avery Li-Chun. An Industrial-Strength Audio Search Algorithm. Oct. 27, 2003, 7 pages. [online]. [retrieved on May 12, 2020] Retrieved from the Internet URL: https://www.researchgate.net/publication/220723446_An_Industrial_Strength_Audio_Search_Algorithm.

* cited by examiner

METHOD AND SYSTEM FOR AUTHENTICATING A DEVICE

This application is the U.S. national phase of International Application No. PCT/GB2018/050779 filed 23 Mar. 2018, which designated the U.S. and claims priority to GB Patent Application No. 1704636.8 filed 23 Mar. 2017, the entire contents of each of which are hereby incorporated by reference.

FIELD OF INVENTION

The present invention is in the field of device authentication for communications. More particularly, but not exclusively, the present invention relates to a method and system for authenticating a device with a wireless access point.

BACKGROUND

Internet of Things (IoT) devices are computing devices which do not have the form factor of a traditional PC computer and usually perform a limited set of functions such as measuring temperature, recording video or providing lighting control. They often are connected to the internet and send/receive data over a network in order to coordinate and control the behaviour of these devices from a central service.

Due to their form factor IoT devices often do not have screens or extensive user input controls, such as a keyboard. Often, but not always, user input is limited to a small number of buttons, and output reduced to a small number indicator lights.

During the initial setup process, the IoT device must be brought onto a wireless network by passing the network's credentials to the IoT device such that it can then connect directly to the wireless network via a wireless access point. This is often done by configuring a temporary wireless network on the IoT device that a second device, often a mobile phone, can connect to and then pass network credentials.

Current methods often rely on the creation of a temporary ad hoc 'hotspot' to be created by the offline device. Typically a device owner will place the device into a configuration mode by pressing a button or interface element. Once in configuration mode, the device will create a hotspot network to which the owner can connect an additional device. Once a wireless connection is established between the two devices, credentials can be passed from the additional device to the offline device. When the credentials have been transferred the offline device can be reconfigured to connect directly to the network.

There is a desire to make this setup process faster and simpler for the owner/user of the IoT device.

It is an object of the present invention to provide a method and system for authenticating a device with a wireless access point which overcomes the disadvantages of the prior art, or at least provides a useful alternative.

SUMMARY OF INVENTION

According to a first aspect of the invention there is provided a method for authenticating a device with a wireless access point, including:
receiving an audio signal at the device via a microphone;
processing the audio signal to extract a code;
using the code to authenticate the device, at least in part, with the wireless access point; and
in response to the authentication, providing access to one or more network services to the device via the wireless access point.

Other aspects of the invention are described within the claims.

BRIEF DESCRIPTION OF THE DRAWINGS

Embodiments of the invention will now be described, by way of example only, with reference to the accompanying drawings in which.

DETAILED DESCRIPTION OF PREFERRED EMBODIMENTS

The present invention provides a method and system for authenticating a device with a wireless access point.

The inventors have determined that existing methods for authenticating new network-capable devices to wireless access points are cumbersome, particularly, when the devices are not general-purpose computing devices, such as IoT devices.

The inventors have discovered that audio can be used to facilitate the authentication process by encoding information in an audio signal for receipt by a network-capable device to assist that device in authenticating itself with a wireless network. The information might include, for example, WiFi credentials.

Figure 1:
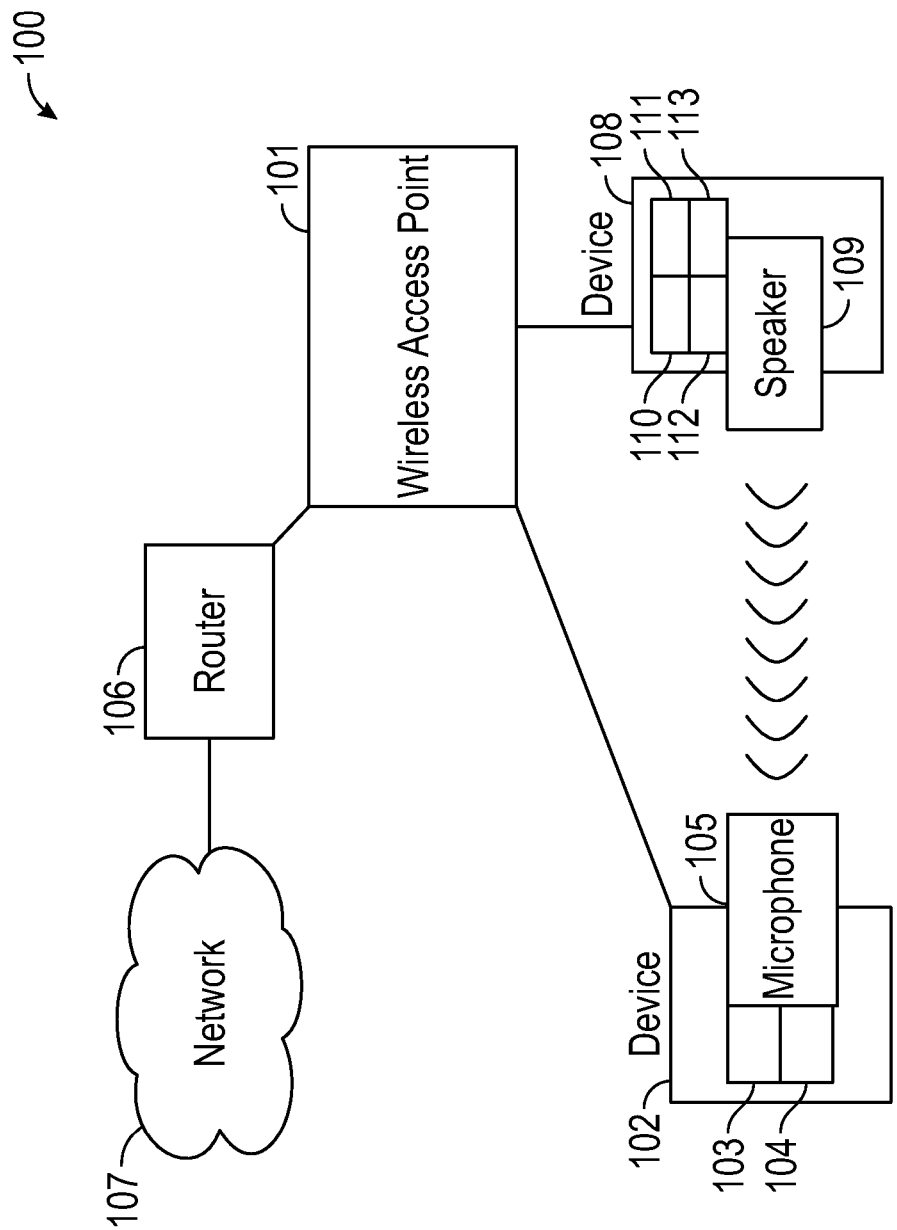
FIG. 1: shows a block diagram illustrating a system in accordance with an embodiment of the invention.

In FIG. 1, a system 100 in accordance with an embodiment of the invention is shown.

A wireless access point 101 is shown. The wireless access point may be configured to broadcast a SSID (Service Set IDentifier) over a wireless protocol such as 802.11 or 802.15.1. In some embodiments, instead of WiFi, the wireless access point may be Bluetooth, Zigbee, or any other wireless standard.

A network-capable device 102 is shown. The network-capable device may be a non-general purpose computing device, such as an Internet-of-Things (IoT) device. The IoT device include, for example, sensors (e.g. for sensing light, heat, humidity, electricity, liquid levels, temperature, smoke, etc.) and/or control apparatus (e.g. to control electricity, mechanical/electrical apparatus, etc.)

The network-capable device 102 may include a processor 103, a wireless communication module 104 and a microphone 105.

The processor 103 may be configured for receiving an audio signal via the microphone 105, processing the audio signal to extract a code, and using the code to authenticate the device 102 with the wireless access point 101 via the wireless communication module 104.

A router 106 is shown. The router may be configured for mediating connections between devices across a network 107. The router 106 and wireless access point 101 may be collocated within the same apparatus.

A second device 108 is shown. The second device 108 may include or be connected to a speaker 109. The device 108 may be a user device such as a mobile user device (e.g. portable computer, smartphone, or tablet), a desktop computer, a television, a radio, or a landline telephone. In one embodiment, the second device 108 is another IoT device.

The second device 108 may include a user input apparatus 110 (e.g. a physical button, a touch-pad, a touch-screen, etc.), a processor 111, a memory 112, and a communications module 113.

The second device 108 may be configured to generate an audio signal at the speaker 109 for receipt by the microphone 105 at the network-capable device 102. The audio signal may encode the code which is subsequently extracted by the network-capable device 102. The second device 108 may generate the audio signal at the speaker 109 in response to input received at the user input apparatus.

It will be appreciated by those skilled in the art that the above embodiments of the invention may be deployed on different devices and in differing architectures.

Figure 2:
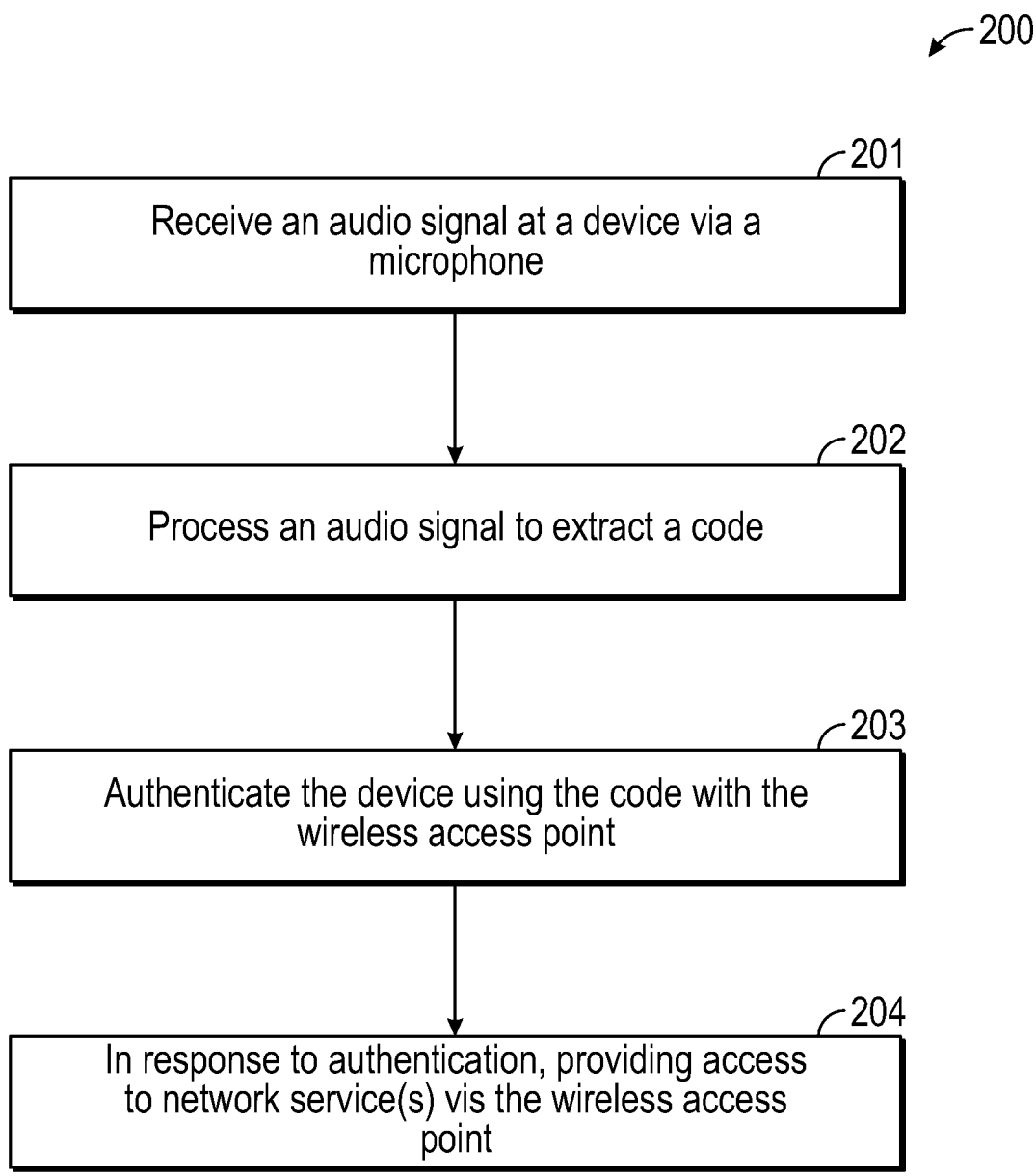
FIG. 2: shows a flow diagram illustrating a method in accordance with an embodiment of the invention.

Referring to FIG. 2, a method 200 for authenticating a device (e.g. 102) with a wireless access point (e.g. 101) in accordance with an embodiment of the invention will be described.

In step 201, an audio signal is received at the device (e.g. 102) via a microphone (e.g. 105). The audio signal may be received from a speaker (e.g. 109) at another device (e.g. 108). The code may be encoded within the audio signal via an audio protocol (such as described in US Patent Publication No. 2012/084131A1). The encoding may happen at the other device (e.g. 108) or the other device (e.g. 108) may receive an audio signal for play-back encoded at another location (e.g. server or device) which may be local or remote to the devices.

In step 202, the audio signal is processed to extract a code (e.g. at processor 103). The audio signal may be processed locally or remotely. The code may include WiFi credentials such as a SSID and passphrase for the wireless access point. In some embodiments, the code may include additional information such as user account information. The code may be encrypted. The encryption may be via symmetric or asymmetric keys. In one embodiment, the device transmits its public key which is used to encrypt the code via PKI during encoding by the other device (e.g. 108).

Figure 2A:
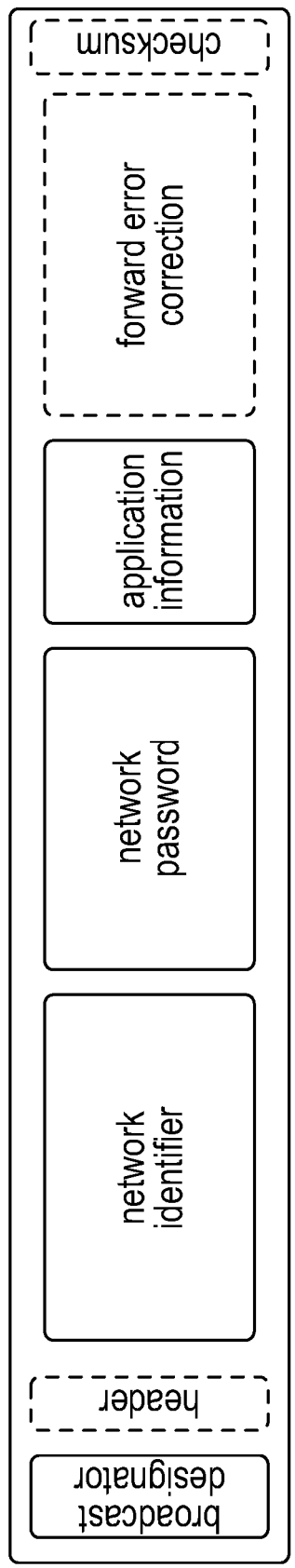
FIGS. 2a and 2b: shows block diagrams illustrating exemplary packet structures for the audio signal used by methods in accordance with embodiments of the invention.
Figure 2B:
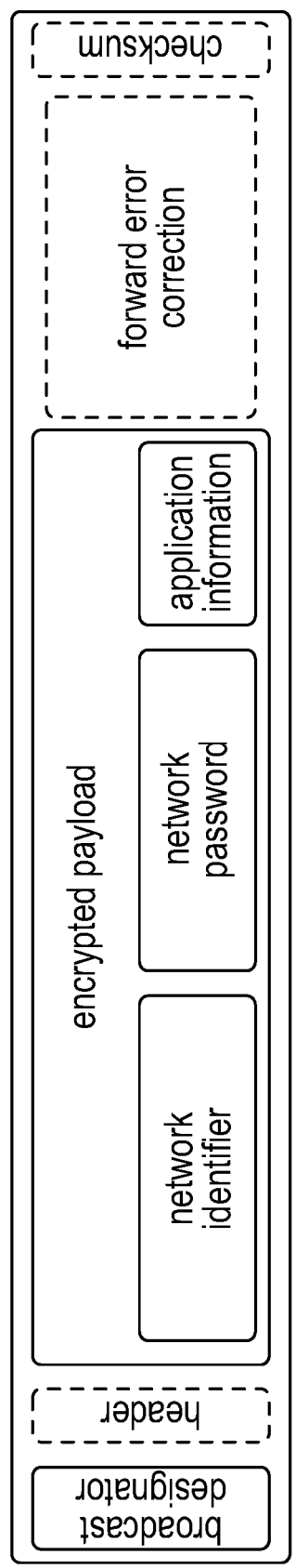

The code may be embedded within a packet structure within the audio signal. The packet structure may comprise one or more of a header, a payload (e.g. for the code), error correction, and a checksum. Part of the packet may be encrypted (e.g. just the payload). Exemplary packet structures are shown in FIGS. 2a and 2b.

In step 203, the code is used to authenticate the device, at least in part, with the wireless access point. For example, the device may utilise its wireless communications module (104) to connect to the SSID using the passphrase.

In step 204, in response to the authentication, access is provided to one or more network services to the device via the wireless access point. Partial authentication may be provided, for example, the device may utilise pre-stored identity information and/or security information to further validate itself with the wireless access point, the router, or a server to access network services.

In some embodiments, the same audio signal may be received by microphones at multiple devices, each device may process the audio signal to extract the code, and use the code, at least in part, to authenticate each device with the wireless access point. In this way, multiple devices may "onboarded" with the wireless access point at one time.

In embodiments, the device may be configured to listen for audio signals at the microphone or to process received audio signals or to use codes extracted from audio signals when the device is not authenticated with the wireless access point. That is, if the device is already authenticated, it may not continuously attempt to reauthenticate. In embodiments, where the device subsequently loses authentication (for example, if the credentials are no longer valid), it may go again into "listening mode" where audio signals received are processed and the extracted code used to authenticate.

In one embodiment, the device may go into "listening mode" for a period of time after a user actuates a user input at the device (e.g. by pressing a physical button or virtual button), or when the device is powered up.

In embodiments, the device may always be in "listening mode".

Embodiments of the present invention will be now be described with reference to FIGS. 3 to 6.

In one embodiment, the user provides power to the offline device. After checking its connection status, this device may automatically start listening for audio codes, this would allow the configuration mode to be entered without user input. In one embodiment, the user presses an input button to enter this mode. In one embodiment, the device is always listening for audio codes this allows the device it to respond to new codes at any point.

A second device, having the network credentials provided to it by input from the user from a network connection or by the operating system of the device is used to encode network credentials and extra arbitrary application information into audio. These credentials may comprise of SSID and password as defined by 802.11i or 802.11i-2004. This device may be physically at the same location as the offline device or may have its audio transmitted by a third channel such as a telephone line or internet streamed audio to a speaker for local audio generation. In one embodiment, the audio code recorded and subsequently played from an audio storage medium. It is understood that the encoding of the data into an audio signal, and the broadcasting of this audio signal from a loudspeaker may occur on separate devices.

The offline device, receiving audio from the credentialed device decodes the audio code and uses these credentials to connect to a wired or wireless network.

In an alternative embodiment, the user provides power to the offline device. After checking its connection status, this device may automatically start broadcasting an audio signal to request credentials from a credentialed device. This broadcast may include the device's public key. In one embodiment, the user presses an input button to enter this mode. In one embodiment, the public key is provided to the credentialed device by means of a QR code, NFC Forum compatible tag or Bluetooth connection.

A second device, having the network credentials provided to it by input from the user, from a network connection or by the operating system of the device, is used to encode network credentials and extra arbitrary application information into audio. It may encrypt this data before sending using the offline device's public key. These credentials may comprise a SSID and passphrase as defined by 802.11i or 802.11i-2004. This device may be physically at the same location as the offline device or may have its audio transmitted by a third channel such as a telephone line or internet streamed audio. In one embodiment, the audio code is recorded to and subsequently played from an audio storage medium. It is understood that the encoding of the data into an audio signal, and the broadcasting of this audio signal from a loudspeaker may occur on separate devices.

The offline device, receiving audio from the credentialed device may decode the audio code and decrypt the received data to extract network credentials. The device may use these credentials to connect to a wired or wireless network. In one embodiment, the received data are used by the offline device to share the credentials with a third device.

Figure 3:
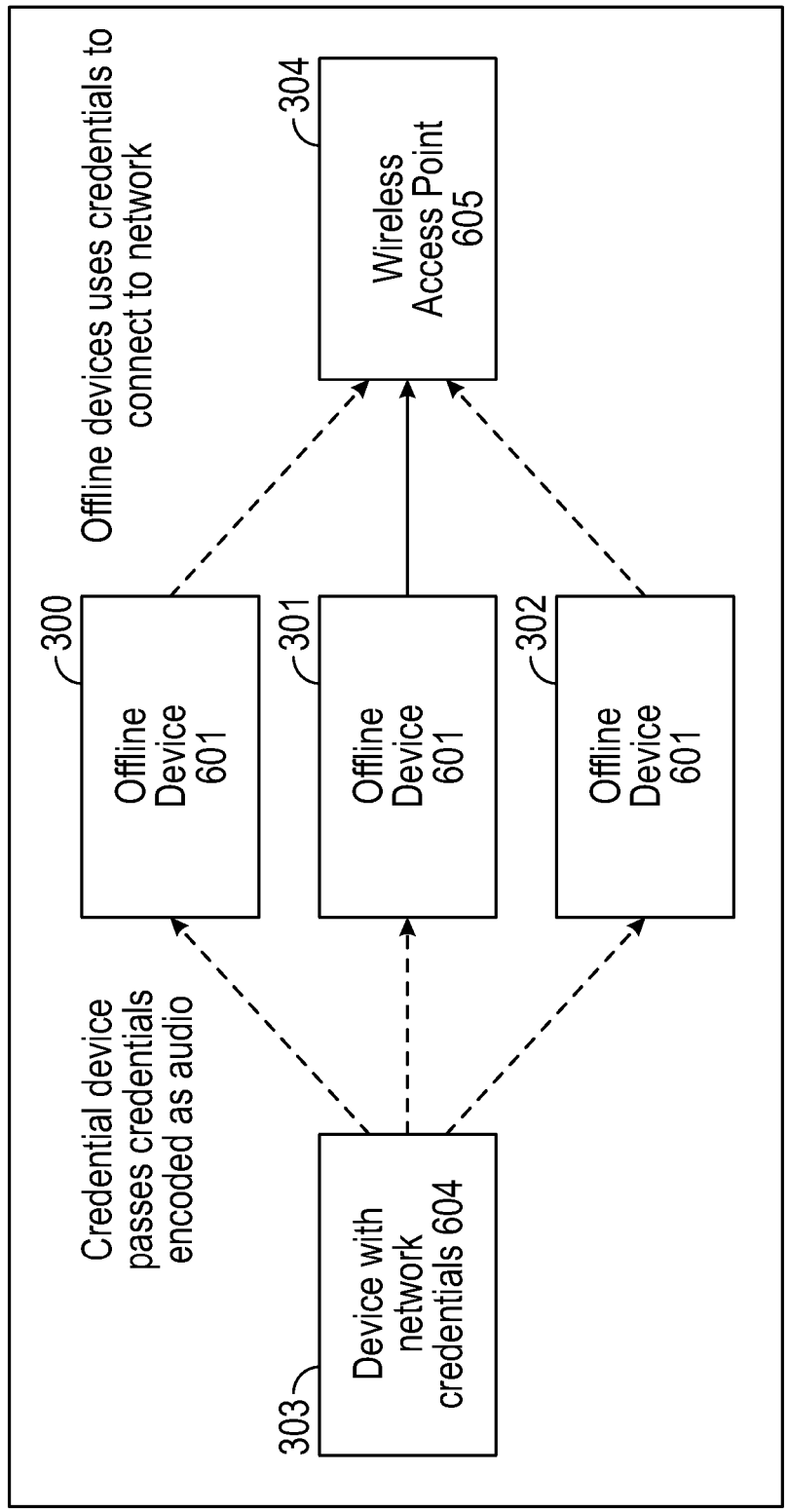
FIGS. 3 to 6: shows diagrams illustrating methods and systems in accordance with an embodiment of the invention.

In one embodiment shown in FIG. 3, a plurality of devices 300, 301 and 302 are able to receive data from a first device 303. In a consumer setting, for example, a set of multiple network connected light bulbs may be provisioned concurrently by broadcasting the network credentials from device 303 such that each lightbulb receives the audio encoded data independently.

It can be seen that, in some embodiments, in order to provide a code to the offline device, the sending device does not itself need to be connected to a network.

In one embodiment, the first device (e.g. 301 to 303) activates the microphone only if it is not connected to a wired or wireless network.

The second device (e.g. 303) may be actuated by the user of the first device (e.g. 300 to 302) to transmit the audio signal. For example, by pressing a virtual button, or a voice command. In one embodiment, the second device may transmit the audio code continuously.

The audio signal may decoded at the first device to extract a code. The code may be encoded within the audio signal via an audio protocol (such as described in US Patent Publication No. 2012/084131A1).

This encoding may use a series of pitched tones to designate each symbol in the data to be broadcast. These tones may be audible or contain only high frequencies such that they are inaudible to humans. The series of pitched tones may contain broadcast designator tones at the beginning of the series which the receiver may use to initiate the decoding sequence on the receiver. The broadcast may vary in length such that more complex credentials take more time to broadcast, and less complex credentials take less time to broadcast.

Those knowledgeable in the art will understand that pitches may be modulated by a number of encoding strategies. A preferred embodiment uses Multi-Frequency Shift Keying (MFSK). It is understood that other modulation strategies can be used, these may include Frequency Shift Keying (FSK) or Frequency Division Multiplexing techniques (FDM).

The data symbols in each broadcast may be grouped such that they designate information about the broadcast, device or may contain other information useful to the receiver to aid decoding or device functionality after the decoding of the modulated audio. The data symbols may represent the network credentials directly or may represent the network credentials in an encrypted or tokenized form. The data symbols may be grouped such that there is a checksum to validate the broadcast data integrity.

The broadcast may contain additional application information in addition to the network credentials. For example, this information may reference the device owner's account or be used by the device (e.g. 300 to 302) to configure its application code or own configuration.

It is understood that the data broadcast may contain additional data to be used by the receiving device or to be passed via the network once a connection is established. For example, the sending device may send the network credentials as well as a customer account identifier, allowing the receiving device to connect to the network using the credentials, and subsequently retrieve relevant customer account information in order to be correctly configured for use. In one embodiment, network credentials and additional configuration data are within separate acoustic broadcasts.

Figure 4:
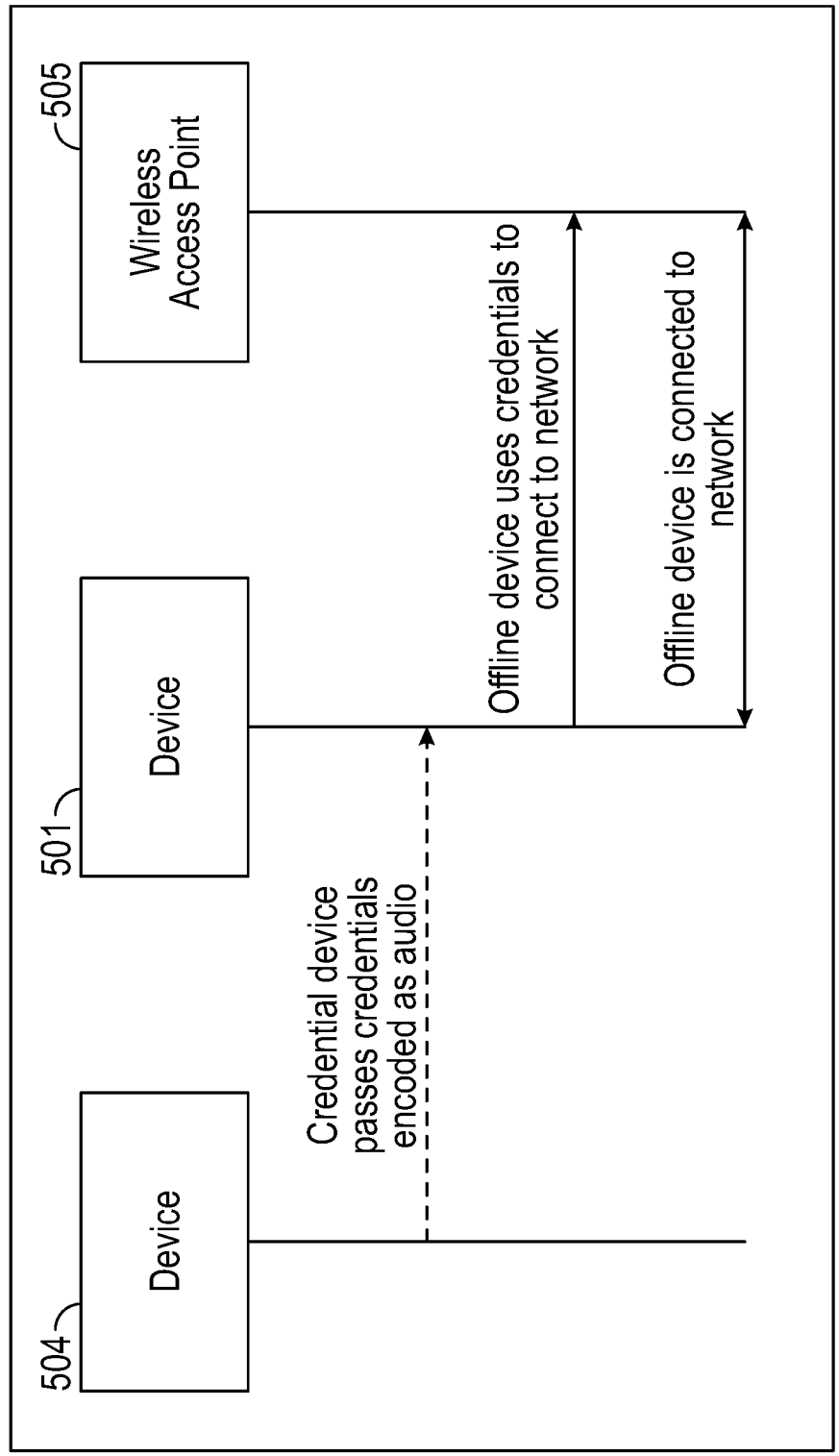

In FIG. 4, the code may be used by the first device 501 to authenticate it (at least in part) with the wireless access point to access network services via the wireless access point 505. The code may be used as the out-of-band communication channel within WiFi Alliance Device Provisioning Protocol (DPP).

The code may include login credentials (for example, for an open network), and/or a wireless password (such as WPA2 or WEP). The code may include WiFi details such as the SSID (Service Set IDentifier).

The code may provide temporary or limited access to the network, further authentication steps may then be taken between the device and network access point.

In one embodiment the device 501 is able to receive audio data broadcasts continuously. Alternatively the device 501 may enable audio data functionality only when no network wired or wireless network are present.

Figure 5:
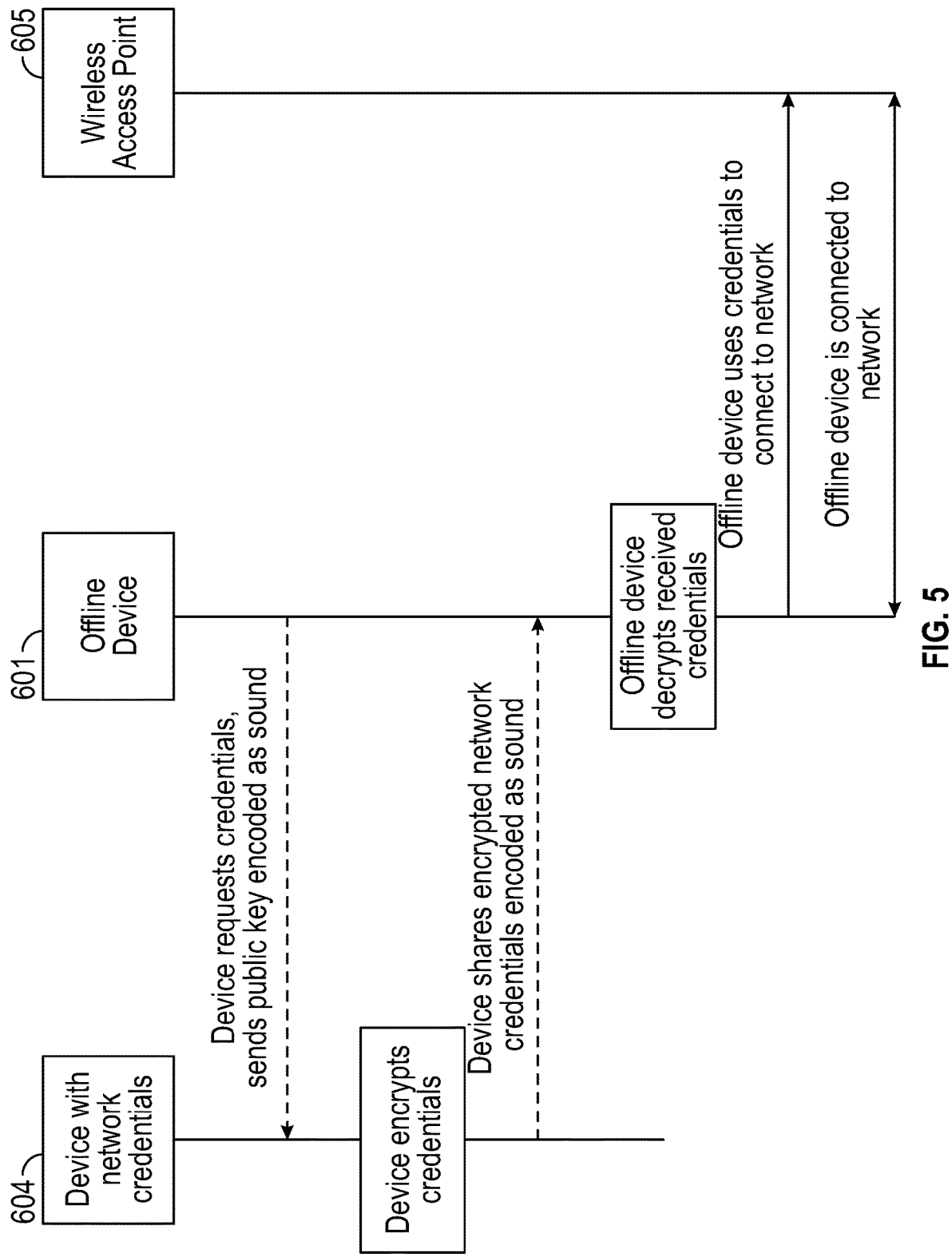

In another embodiment shown in FIG. 5, devices 601 without a network connection are able to signal to neighbouring devices 604 by requesting access using an audio broadcast. In this case, the requesting device 601 may include its PKI public key in the request broadcast. Nearby device 604 or devices that are within audio broadcast range and receive the request can provide network credentials to the requesting device 601.

Figure 6:
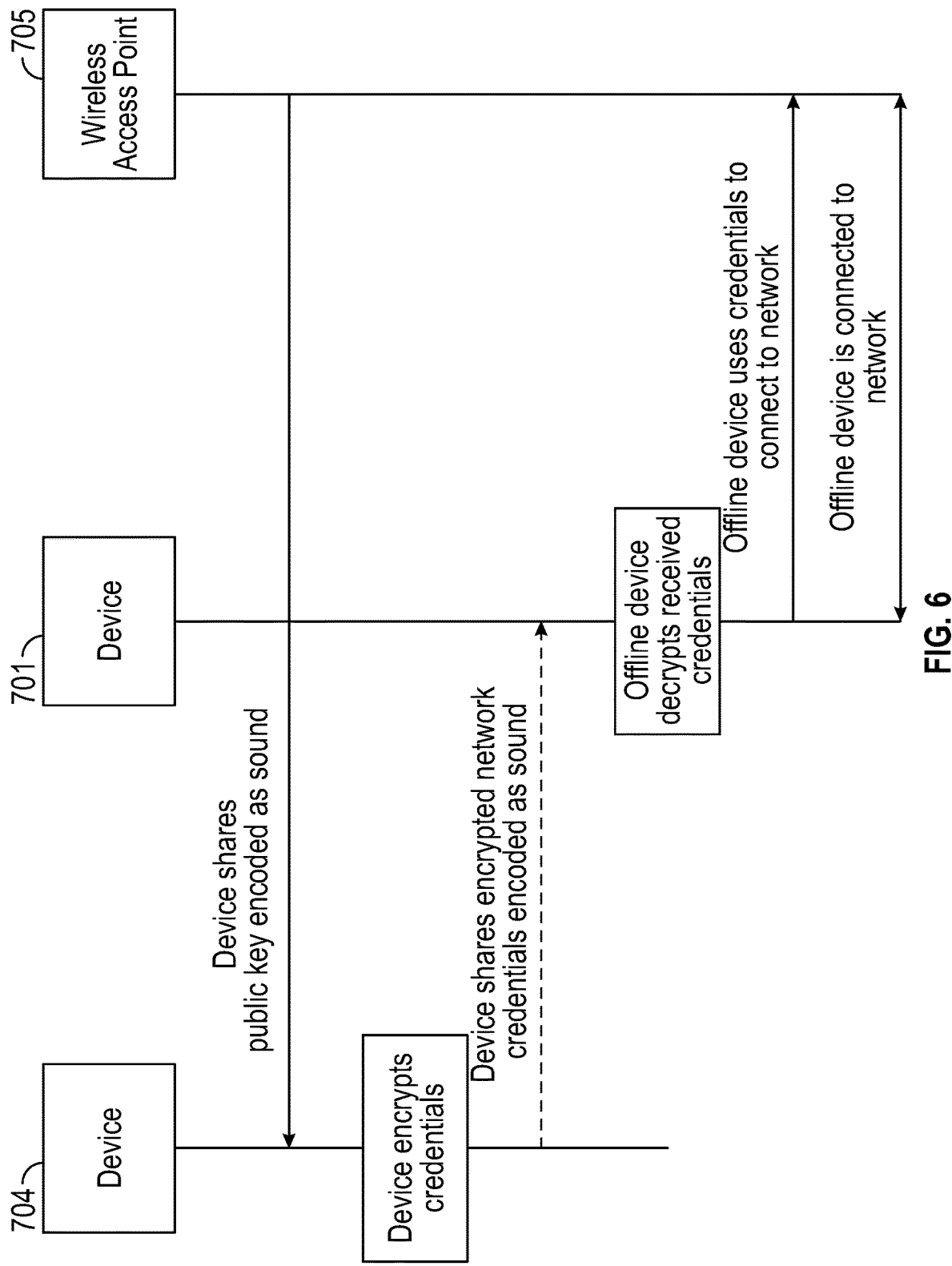

In embodiment shown in FIG. 6, the code may be encrypted such that login credentials are not passed in plain text form during the acoustic broadcast. In one embodiment, the credentials may be encrypted using public-private key encryption. The public key of the offline device is shared with the credentialed device. Sharing of the public key may be facilitated by the offline device using audio encoding by the offline device via a loudspeaker or by other means such as QR code or OCR. The offline device public key may also be shared to the credentialed device via an existing network connection.

Potential advantages of some embodiments of the present invention are:

Ease of use—instead of reconfiguring a mobile user device to connect to an ad-hoc network, the user clicks one button on their mobile user device (or has to take no action at all if the audio plays automatically);

Means of inferring proximity between the devices and the user device (the configuring device) which may increase security—as audio is used, IoT devices will not be able to login from adjacent rooms or buildings (even if the wifi network extends to these locations) as the audio will not be picked up those devices;

Low-cost/no additional hardware required for IoT devices as most have microphones already;

Means of provisioning multiple devices in a single broadcast as many devices within the vicinity of the credentialed device will be able to receive network access; and Offline devices may be able to request network access automatically from neighbouring devices.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departure from the spirit or scope of applicant's general inventive concept.

The invention claimed is:

1. A method for authenticating a device with a wireless access point, including:
broadcasting, via a speaker included in the device, a requesting audio signal to request authentication information based on a determination that the device is not authenticated with the wireless access point, wherein the requesting audio signal encodes a public key of the device;
in response to the broadcasting of the requesting audio signal, receiving, at the device via a microphone, an audio signal encoding a code encrypted based on the public key of the device;
processing the audio signal to extract the code based on the public key of the device;
using the code to authenticate the device, at least in part, with the wireless access point; and
in response to the authentication, providing access to one or more network services to the device via the wireless access point.

2. A method as claimed in claim 1, wherein the audio signal is received from a speaker at a second device.

3. A method as claimed in claim 2, wherein the second device is a user device.

4. A method as claimed in claim 2, wherein the second device is actuated by a user of the second device to generate the audio signal at the speaker.

5. A method as claimed in claim 2, wherein the second device is triggered to generate the audio signal at the speaker by receiving the requesting audio signal from the device.

6. A method as claimed in claim 1, wherein the code includes WiFi credentials for the wireless access point.

7. A method as claimed in claim 6, wherein the WiFi credentials includes SSID for the wireless access point, and a password for the wireless access point.

8. A method as claimed in claim 1, wherein the network services include Internet services.

9. A method as claimed in claim 1, wherein the device is an IoT device.

10. A method as claimed in claim 1, wherein the device is not a general purpose computing device.

11. A method as claimed in claim 1, wherein the code is audibly encoded within the audio signal.

12. A method as claimed in claim 1, wherein the code is inaudibly encoded within the audio signal.

13. A method as claimed in claim 1, wherein a plurality of devices receive the audio signal, each device extracting the code from the audio signal, and using the code to authenticate that device, at least in part, with the wireless access point.

14. A method as claimed in claim 1, wherein the audio signal comprises information encoded within a packet.

15. A method as claimed in claim 14, wherein the packet includes a header, a payload and one or more selected from the set of error correction, encryption and a checksum.

16. A method as claimed in claim 15, wherein the code is within the payload.

17. A method as claimed in claim 1, wherein the device listens for the audio signal at the microphone when the device is not authenticated with the wireless access point.

18. A method as claimed in claim 1, wherein the device listens for the audio signal at the microphone for a predetermine period of time when the device receives user input at the device.

19. The method as claimed in claim 1, wherein the audio signal is processed to extract user account information and the method includes transmitting the user account information to the one or more network services via the wireless access point.

20. The method as claimed in claim 1, wherein the audio signal is processed to extract a customer account identifier and the method further includes: retrieving customer account information from the one or more network services based on the extracted customer account identifier, and configuring the device based on the retrieved customer account information.

21. A device comprising:
a speaker;
a microphone;
communication circuitry; and
one or more processors operatively coupled to the speaker, the microphone and the communication circuitry, and configured to:
broadcast, via the speaker, a requesting audio signal to request authentication information based on a determination that the device is not authenticated with a wireless access point, wherein the requesting audio signal encodes a public key of the device;
in response to the broadcasting of the requesting audio signal, receive, at the device via the microphone, an audio signal encoding a code encrypted based on the public key of the device;
process the audio signal to extract the code based on the public key of the device;
authenticate, via the communication circuitry, the device, at least in part, with the wireless access point based on the code; and
in response to the authentication, provide access to one or more network services to the device via the communication circuitry and the wireless access point.

22. A non-transitory computer readable medium having stored therein computer-readable instructions that, when executed by one or more processors of a device, cause the device to:
broadcast, via a speaker included in the device, a requesting audio signal to request authentication information based on a determination that the device is not authenticated with a wireless access point wherein the requesting audio signal encodes a public key of the device;
in response to the broadcasting of the requesting audio signal, receive, at the device via a microphone an audio signal encoding a code encrypted based on the public key of the device;
process the audio signal to extract the code based on the public key of the device;
authenticate the device, at least in part, with the wireless access point based on the code; and
in response to the authentication, provide access to one or more network services to the device via the wireless access point.

* * * * *